United States Patent [19]

Strickland

[11] Patent Number: 4,700,690

[45] Date of Patent: Oct. 20, 1987

[54] SOLAR APPARATUS

[76] Inventor: Benjamin W. Strickland, Box 30, Joliet, Mont. 59041

[21] Appl. No.: 25,940

[22] Filed: Mar. 16, 1987

[51] Int. Cl.$^4$ ................................................ F24J 2/38
[52] U.S. Cl. .................................... 126/424; 126/425; 126/438; 165/67; 250/491.1
[58] Field of Search ............. 126/438, 435, 439, 436, 126/424, 425, 450, 451, 417, 400; 353/3; 165/67, 68, 80; 250/491.1

[56] References Cited

U.S. PATENT DOCUMENTS

| | | | |
|---|---|---|---|
| 1,951,404 | 3/1934 | Goddard | 126/425 |
| 2,920,710 | 1/1960 | Howard | 126/424 |
| 3,052,229 | 9/1962 | Wenger | 126/424 |
| 3,999,389 | 12/1976 | Bryce | 126/424 |
| 4,015,585 | 4/1977 | Fattor | 126/438 |
| 4,256,175 | 3/1981 | Strickland | 165/67 |
| 4,291,678 | 9/1981 | Strickland | 126/451 |
| 4,332,238 | 6/1982 | Garcia, Jr. | 126/438 |
| 4,356,812 | 11/1982 | Haven | 126/425 |
| 4,363,354 | 12/1982 | Strickland | 165/67 |
| 4,422,446 | 12/1983 | Strickland | 126/449 |

Primary Examiner—James C. Yeung
Attorney, Agent, or Firm—Arthur L. Urban

[57] ABSTRACT

Solar apparatus includes a base portion, a supporting portion, a reflecting portion, a collecting portion and an actuating portion. The base portion includes a major surface disposed in a generally horizontal plane with a pivot member extending upwardly therefrom. The supporting portion includes a table section supported on the pivot member above the major surface and oriented substantially parallel thereto. A frame section extends upwardly from the table section. The reflecting portion includes a curved reflective section extending upwardly from the frame section with a lower part of the reflective section being pivotally connected to the frame section. The collecting portion includes an elongated channel section disposed adjacent the lower part of the reflective section and substantially parallel thereto, the channel section having a curved surface facing the concave surface of the reflective section and pivotable therewith. The actuating portion includes extensible support assemblies extending between the table section and side edges of the reflective section. A first drive is mounted on the table section adjacent an end thereof, the first drive being operatively connected to the extensible support assemblies for changing the length thereof. A second drive is mounted on the base portion and operatively connected to the table section to provide rotation thereof with respect to the base portion.

19 Claims, 4 Drawing Figures

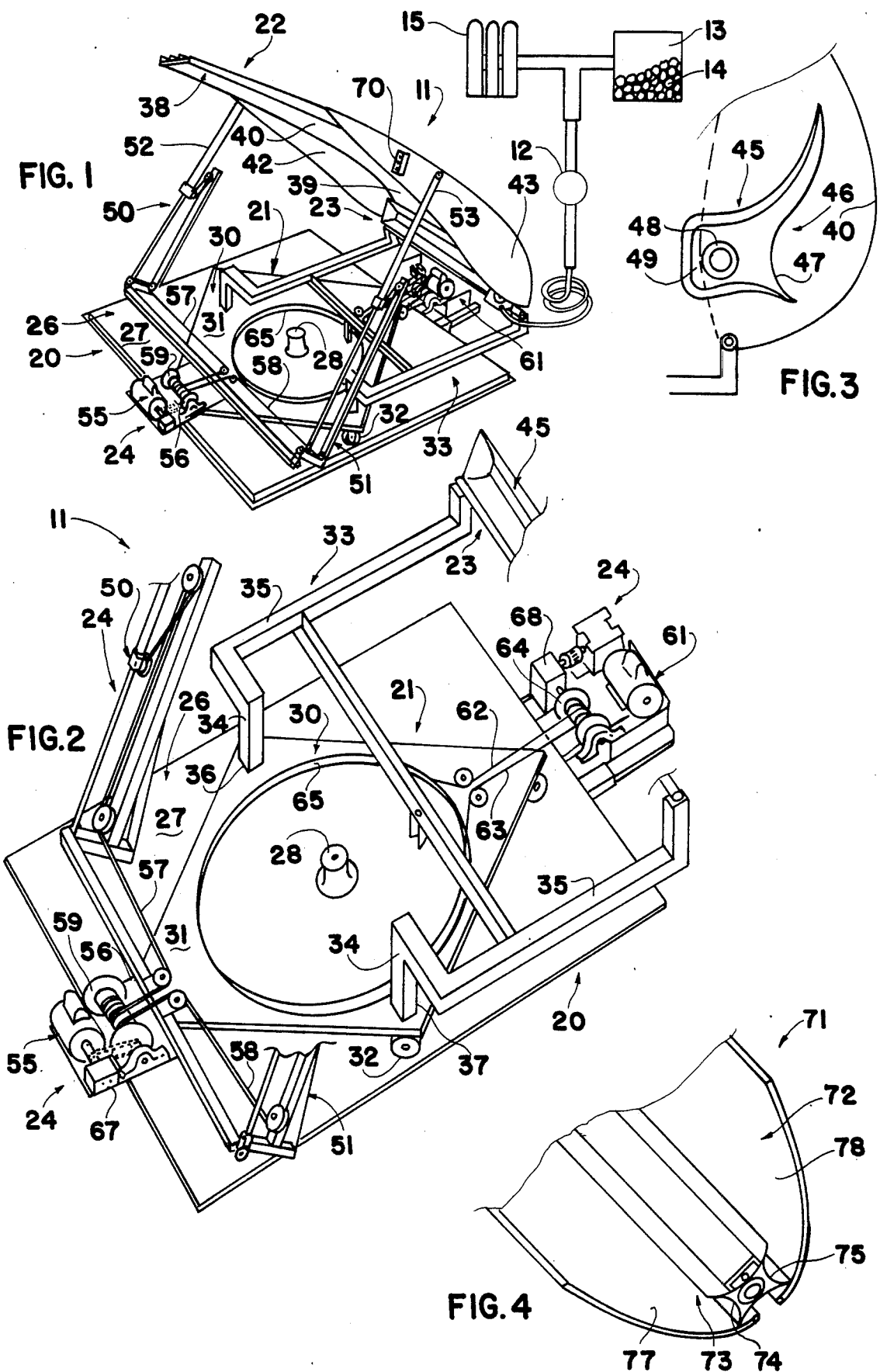

SOLAR APPARATUS

This invention relates to a novel heating apparatus and more particularly relates to a new solar apparatus.

With recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heated fluid is stored. Also, the fluid is circulated through a heat absorbing material, such as a bed of rocks which will absorb and store the heat energy for future recovery.

Since solar energy itself is free, the principal costs of solar energy systems are the initial expenditure for the solar energy converting equipment and the subsequent expense of operating and maintaining the equipment. Ideally, it is desirable to increase the temperature of the gas or liquid as much as possible during each passage of the fluid through the equipment so that a minimum size of equipment will be required to accomplish the desired absorption of heat, Thus, improving the operating efficiency of solar energy conversion systems can result in a significant savings both in capital investment and in operating costs.

In the past it was thought that the more complex the system, the greater the energy recovery. However, since the costs ordinarily increased with the complexity of the system, the cost per unit of energy recovered still was relatively high. Because the costs of such solar energy systems were quite large, the costs exceeded the available resources of the ordinary individual. Thus, the government has offered tax credits and other incentives to increase the acceptance and use of solar energy systems. However, there has been criticism of such incentives since they in effect provide an advantage for one part of the population at the expense of other taxpayers.

Much effort has been expended on ways to improve the efficiency of solar energy systems. One area of improvement is in the design of the actual physical structures utilized. Examples of such activity include Strickland U.S. Pat. Nos. 4,256,175; 4,291,678; 4,363,354 and 4,422,446.

The present invention provides a novel solar apparatus with advantages and features not found on systems previously available. The solar apparatus of the invention is simple in design and relatively inexpensive to manufacture. The solar apparatus further provides a high degree of efficiency of operation. Thus, the apparatus can be of a minimum size for a given heating requirement. Likewise, the equipment costs for a given installation can be minimized.

Another advantage of the solar apparatus of the present invention is that the apparatus can be fabricated from commercially available components and materials using conventional metal working techniques. Also, the apparatus can be fabricated in small self-contained units which can be installed singly or in groups so that energy can be generated in small quantities or larger amounts as desired.

Other benefits and advantages of the novel solar apparatus of the present invention will be apparent from the following description and the accompanying drawings in which:

FIG. 1 is a view in perspective of one form of solar apparatus of the invention in use;

FIG. 2 is an enlarged fragmentary view in perspective of the base, supporting and actuating portions of the solar apparatus shown in FIG. 1;

FIG. 3 is a further enlarged cross-sectional view of the collecting portion of the solar apparatus shown in FIG. 1; and FIG. 4 is a fragmentary view in perspective of another form of solar apparatus of the invention.

As shown in FIGS. 1–3 of the drawings, one form of the novel solar apparatus 11 of the present invention is employed as part of a solar heating system which may include circulating means such as pump 12 and a heat storage chamber 13 including a heat absorbing material such as rocks 14. The heating system also may include heat dissipating devices such as radiator 15 located in a room of a dwelling.

Solar apparatus 11 of the invention includes a base portion 20, a supporting portion 21, a reflecting portion 22, a collecting portion 23 and an actuating portion 24.

The base portion 20 of the solar apparatus 11 of the invention includes a major surface 26 disposed in a generally horizontal plane. Advantageously, the major surface may be the upper surface of a horizontal plate section 27. A pivot member 28 extends upwardly from the major surface 26 adjacent the center thereof.

The supporting portion 21 of the solar apparatus 11 of the present invention includes a table section 30. The table section 30 is supported on the pivot member 28 above the major surface 26. The table section is oriented substantially parallel to the major surface.

The table section 30 advantageously includes a steel plate section 31. The largest dimension of the table section preferably is slightly less than the smallest dimensions of the major surface 26 of the base portion. The supporting portion advantageously includes a plurality of spaced caster wheels 32 that support the table section. The wheels preferably are located adjacent the periphery of the table section.

The supporting section further includes a frame section 33 extending upwardly from the table section. Advantageously, the frame section includes vertical members 34 and horizontal members 35 extending upwardly from adjacent opposite sides 36 and 37 of the table section.

The reflecting portion 22 of the solar apparatus 11 includes a curved reflective section 38. The curved section 38 extends upwardly from the frame section 33. As shown, this is at a point offset from the pivot member 28. A lower part 39 of the reflective section 38 is pivotally connected to the frame section 33. A concave surface 40 of the reflective section 38 faces toward the pivot member 28.

The reflective section 38 advantageously has a cross section which is at least one-half of a parabola as shown in FIGS. 1 and 2. The reflective section preferably includes parallel side sections 42 and 43. Advantageously, the reflective section includes a reflective metal sheet.

The collecting portion 23 of the solar apparatus 11 of the invention includes an elongated channel section 45. The channel section 45 is disposed adjacent the lower part 39 of the reflective section 38 and is substantially parallel thereto. The channel section has a curved surface 46 facing the concave surface 40 of the reflective section. The channel section 45 is affixed with respect to the reflective section 38 and is pivotable therewith.

Advantageously, the curved surface 46 of the channel section includes a concave portion 47. The channel section 45 preferably includes a conduit 48 along the length thereof with a conductive metal mass 49 surrounding the conduit.

The actuating portion 24 of the solar apparatus 11 of the present invention includes extensible support assemblies 50 and 51. The support assemblies 50 and 51 extend between the table section 30 and side edges of the reflective section 38. Each extensible support assembly 50 or 51 advantageously includes a piston/cylinder combination, 52 and 53 respectively.

The actuating portion 24 also includes first drive means 55. The first drive 55 is mounted on the table section 30 adjacent an end 56 thereof. The first drive is operatively connected to the extensible support assemblies for changing the length thereof.

The first drive means 55 advantageously is mounted on the table section at an end 56 thereof spaced from the reflective section 38. The first drive preferably is operatively connected to the support assemblies 50 and 51 through flexible connectors e.g. cables 57 and 58. The flexible connectors advantageously are windable onto a common drum member 59.

Second drive means 61 is mounted on the base portion 21 to be normally remote from the first drive means 55. The second drive 61 is operatively connected to the table section 30 and provides rotation of the table section with respect to the base portion.

The second drive means 61 preferably is operatively connected to the table section through flexible connectors e.g. cables 62 and 63. The flexible connectors advantageously are wound onto a common drum member 64 in opposite directions. The flexible connectors 62 and 63 preferably are wound around a circular section 65 on the table section. The first and second drive means 55 and 61 respectively advantageously include gear assemblies 67 and 68 respectively.

Tracking means 70 is utilized to maintain the reflective section 38 directed toward the sun continuously as the position of the sun changes during a day. The tracking means 70 which can be mounted on a side section 42 or 43 of the reflective section may include a plurality of sensing elements such as shrouded photoelectric cells. The sensing elements are connected with appropriate control circuitry to energize the first and/or second drive means 55 and 61 for changing the direction and/or inclination of the reflective section when the photocells are not completely exposed to the sun. Advantageously, the circuitry also can lower the reflective section 38 close to table section 30 during the night or when severe winds are encountered.

FIG. 4 illustrates another form of solar apparatus 71 of the present invention. As shown, apparatus 71 differs from apparatus 11 in that it includes a reflective section 72 having a full parabola cross section, i.e., a cross section combining two reflective sections 38 of apparatus 11. Also, a channel section 73 is employed including opposed curved surfaces 74 and 75 with one curved section being in focus with each side 77 or 78 of the parabola.

In the operation of the solar apparatus 11 of the present invention as shown in FIGS. 1-3 of the drawings, the collecting portion 23 is connected into a closed heating system including a pump 12, a heat storage chamber 13 and a number of heat dissipating devices shown as radiator 15. The reflective section 38 of solar apparatus 11 is oriented toward the sun by actuating first and second drive means 55 and 61. First drive 55 aligns the inclination of the reflective section and second drive 61 turns the reflective section in the direction of the sun.

The sun's rays striking the concave surface 40 of the highly reflective section 38 are reflected toward the collector portion 23. The curved surface 46 of the elongated channel section 45 is positioned at the focal point of the reflective section. The rays of the sun heat the collector portion 23 which in turn heats fluid, gas or liquid, circulating through conduit 48 along the length of the channel section.

The fluid circulating through conduit 46 can be transferred directly to heat dissipating devices e.g. radiator 15 by means of pump 12. Alternatively, if no heat is required by radiator 15, the heated fluid exiting collector portion 23 may be diverted through heat storage chamber 13 including heat absorbing rocks 14. When the radiator calls for heat, fluid can be circulated through storage chamber 13 to absorb heat therefrom and then circulated if the sun is not shining on the solar apparatus 11 such as on cloudy days or at night.

Solar apparatus 71 shown in FIG. 4 may be operated in the same way as apparatus 11 with more heat being generated since the reflective section 72 has twice the surface area of reflective section 38 of apparatus 11.

The above description and the accompanying drawings show that the present invention provides a novel solar apparatus which is simple in design and relatively inexpensive. The solar apparatus of the invention provides for the generation of heat efficiently. Also, the equipment can be of a minimum size with a significant savings in capital investment and operating costs because of the high efficiency of the apparatus of the invention. The solar apparatus of the invention can be fabricated from commercially available components and materials utilizing conventional metal working techniques.

The solar apparatus of the invention can be used as an individual unit or several combined into unitary structures. The apparatus of the invention thus provides a convenient means for generating small quantities of heat such as for a single dwelling or larger amounts such as for a business, an apartment or groups of dwellings.

It will be apparent that various modifications can be made in the particular solar apparatus described in detail and shown in the drawings within the scope of the invention. For example, the size, configuration and arrangement of the components may be changed provided they do not adversely affect the operation of the apparatus. Also, the apparatus can be mounted on a trailer as a mobile heating apparatus. Therefore, the scope of the invention is to be limited only by the following claims.

What is claimed is:

1. Solar apparatus including a base portion, a supporting portion, a reflecting portion, a collecting portion and an actuating portion; said base portion including a major surface disposed in a generally horizontal plane, a pivot member extending upwardly from said major surface adjacent the center thereof; said supporting portion including a table section supported on said pivot member above said major surface and oriented substantially parallel thereto, a frame section extending upwardly from said table section; said reflecting portion including a curved reflective section extending upwardly from said frame section, a lower part of said reflective section being pivotally connected to said frame section, a concave surface of said reflective section facing toward said pivot member; said collecting portion including an elongated channel section disposed adjacent said lower part of said reflective section and substantially parallel thereto, said channel section having a curved surface facing said concave surface of said reflective section, said channel section being affixed with respect to said reflective section and pivotable therewith; said actuating portion including extensible support assemblies extending between said table section and side edges of said reflective section, first drive means mounted on said table section adjacent an end thereof, said first drive means being operatively connected to said extensible support assemblies for changing the length thereof; second drive means mounted on said base portion remote from said first drive means, said second drive means being operatively connected to said table section and providing rotation thereof with respect to said base portion; whereby the inclination of said reflective section is adjusted by said first drive means and said extensible support assemblies and the facing of said reflective section is adjusted by said second drive means so the position of said reflective section will face the sun from morning to evening with solar radiation being reflected by said reflective section onto said collecting portion.

2. Solar apparatus according to claim 1 wherein said base portion includes a horizontal steel plate section.

3. Solar apparatus according to claim 1 wherein said table section includes a steel plate section with the largest dimension slightly less than the smallest dimension of said major surface of said base portion.

4. Solar apparatus according to claim 1 wherein said supporting portion includes a plurality of spaced caster wheels supporting said table section.

5. Solar apparatus according to claim 1 wherein said frame section includes vertical and horizontal members extending upwardly from opposite sides of said table section.

6. Solar apparatus according to claim 1 wherein said reflective section has a cross section which is at least one-half of a parabola.

7. Solar apparatus according to claim 1 wherein said reflective section has a parabolic cross section.

8. Solar apparatus according to claim 1 wherein said reflective section extends upwardly from said frame section at a point offset from said pivot member.

9. Solar apparatus according to claim 1 wherein said reflective section includes parallel side sections.

10. Solar apparatus according to claim 1 wherein said reflective section includes a reflective metal sheet.

11. Solar apparatus according to claim 1 wherein said curved surface of said channel section includes a concave portion.

12. Solar apparatus according to claim 1 wherein said channel section includes a conduit along the length thereof and a conductive metal mass surrounding said conduit.

13. Solar apparatus according to claim 1 wherein each of said extensible support assemblies includes a piston/cylinder combination.

14. Solar apparatus according to claim 1 wherein said first drive means is mounted on said table section at an end thereof spaced from said reflective section.

15. Solar apparatus according to claim 1 wherein said first drive means is operatively connected to said support assemblies through flexible connectors windable on a common drum member.

16. Solar apparatus according to claim 1 wherein said second drive means is operatively connected to said table section through flexible connectors windable onto a common drum member.

17. Solar apparatus according to claim 16 wherein said flexible connectors are cables wound onto said drum member in opposite directions.

18. Solar apparatus according to claim 16 wherein said flexible connectors are wound around a circular section on said table section.

19. Solar apparatus according to claim 1 wherein said first and second drive means include gear assemblies.

* * * * *